United States Patent [19] [11] 3,720,933
Schulein et al. [45] March 13, 1973

[54] SIGNALING SYSTEM WITH SIGNAL LEVEL DIFFERENTIATION

[75] Inventors: Joseph Schulein; Joe M. Kortman, both of Vancouver, Wash.

[73] Assignees: Hayward H. Dutton, Tacoma; Joseph Schulein; Margaret A. Schulein, Vancouver, Wash. ; part interest to each

[22] Filed: July 6, 1971

[21] Appl. No.: 159,755

[52] U.S. Cl. ..........340/183, 179/15 BM, 179/15 BY, 179/15 BS

[51] Int. Cl. ..........H04j 3/06

[58] Field of Search........ 179/15 BL, 15 BM, 15 BY, 15 BS,179/15 A; 340/150, 183, 184

[56] References Cited

UNITED STATES PATENTS 3,274,576 9/1966 Guignard..............................340/183
3,400,223 9/1968 Pedrotti............................179/15 BL
2,480,582 8/1949 Houghton.........................179/15 BS

*Primary Examiner*—Ralph D. Blakeslee
*Attorney*—Kolisch, Hartwell & Dickinson

[57] ABSTRACT

A time-division signaling system employing a transmitter and a receiver which communicate in recurrent operating cycles over a common transmission medium. The transmitter is contructed to transmit during an operating cycle time-spaced interleaved indexing and signaling voltage pulses which differ in respective maximum voltage levels. Discrimination between these two different kinds of pulses at the receiver is made on the basis of a comparison of their respective maximum voltage levels with a reference voltage level which has been generated by preceding pulses. The system includes circuitry which assures synchronization between the transmitter and receiver; and a modification of the system further includes circuitry which prevents the receiver from producing a responsive output to any signaling pulse which is received at the time that the transmitter and the receiver are out of synchronization.

15 Claims, 7 Drawing Figures

INVENTOR
JOSEPH SCHULEIN
JOE M. KORTMAN
BY
Kolisch, Hartwell & Dickinson
ATTORNEYS INVENTOR
JOSEPH SCHULEIN
JOE M. KORTMAN
BY
Kolisch, Hartwell & Dickinson
ATTORNEYS INVENTOR
JOSEPH SCHULEIN
JOE M. KORTMAN
BY Kolisch, Hartwell & Dickinson
ATTORNEYS INVENTOR
JOSEPH SCHULEIN
JOE M. KORTMAN
BY Kolisch, Hartwell & Dickinson
ATTORNEYS

SIGNALING SYSTEM WITH SIGNAL LEVEL DIFFERENTIATION

BACKGROUND AND SUMMARY OF THE INVENTION

This invention pertains to a common-transmission-medium time-division signaling system. More particularly, it pertains to such a system which employs time-spaced interleaved indexing and signaling voltage pulses that have different maximum voltage levels. For the purpose of illustration, a preferred embodiment and a modification of the system are described herein in conjunction with communicating supervisory security-type signals.

Time-division signaling systems are particularly useful in transmitting continually changeable digital type information from a plurality of remote stations, which may be relatively widely spaced, to a central monitoring station. Among other reasons, such usefulness is because these systems frequently require only a single transmission medium (which is shared by all transmitting and receiving locations), and because such systems can recurrently and frequently scan each transmitting location to keep received information essentially current. Substantial equipment and maintainance costs can thus be saved in a properly designed and operating system.

Preferably, such a system is constructed to have a high degree of reliability, with the simplest and least costly and most maintainance-free circuitry possible.

A general object of the present invention, therefore, is to provide a new advanced time-division signaling system which offers, in a very practical and satisfactory manner, all of the desirable features just mentioned.

According to a preferred embodiment of the invention, the proposed system is for communicating information between a plurality of pairs of associated spaced-apart signaling and indicating devices. It employs a common transmission medium to which are connected, at spaced-apart points, a transmitter and a receiver. The signaling devices just mentioned are each placeable in signaling and nonsignaling states, and may be disposed at some remote location, as, for example, in a remote building. The indicating devices are placeable in indicating and nonindicating states, and may be located, for example, at some central monitoring station.

The transmitter is adapted to be connected to the signaling devices, and is operable when so connected to supply the transmission medium with successive trains of time-spaced indexing pulses (each associated with a different associated signaling and indicating device), and following each indexing pulse a signaling pulse if the signaling device associated with the just-completed indexing pulse is then in an indicating state. These pulses take the form of voltage pulses, with the indexing pulses having one maximum voltage level, and the signaling pulses having a lower maximum voltage level. At the conclusion of a train of such pulses, the transmitter sends a special synchronizing pulse.

The receiver is adapted to be connected to the indicating devices, and is constructed to follow the indexing pulses in a train. After the receipt of each indexing pulse, the receiver is adapted to control the condition of the indicating device associated with the pulse, in accordance with whether there is thereafter received (before the next indexing pulse) a signaling pulse. The receiver thus normally tends to index and remain synchronized with the transmitter. The synchronizing pulse mentioned above, while transmitted at the conclusion of each train of indexing and signaling pulses, is employed only in the event that the transmitter and receiver have become nonsynchronized.

Featured in a modification of the proposed system is novel circuitry which prevents the receiver from affecting the condition of an indicating device under circumstances with the transmitter and receiver out of synchronization. This feature greatly improves reliability under circumstances where outside electrical disturbances (which might induce or otherwise produce voltage pulses on the transmission medium) are likely to occur.

The various circuits in the proposed system utilize solid state components wherever possible, and thus offer compactness and a high degree of maintainance-free reliability.

DESCRIPTION OF THE DRAWINGS

These and other objects and advantages attained by the invention will become more fully apparent as the description which follows is read in conjunction with the accompanying drawings, wherein.

DETAILED DESCRIPTION OF THE INVENTION

The System Generally

Figure 1:
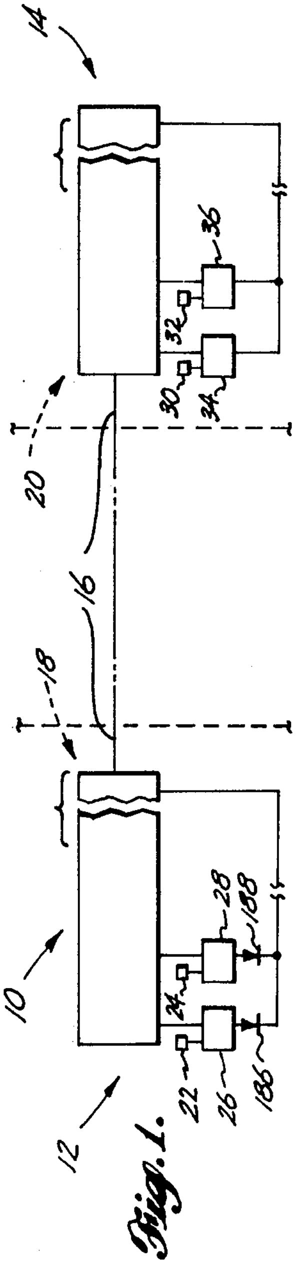
FIG. 1 is a simplified block diagram illustrating a signaling system constructed according to the invention.

Turning now to the drawings, and referring first to FIG. 1, indicated generally at 10 in very simplified block outline is a time-division electrical signaling system constructed according to the present invention. This system includes a transmitter, or transmitter means, 12, and a receiver, or receiver means, 14 connected for communication over a common transmission medium 16. System 10 is employed herein for the transmission of what might be thought of as supervisory security-type signals from a remote location, indicated generally at 18, to a central monitoring station, indicated generally at 20. By way of example, remote location 18 might comprise a remotely located building on a college campus, with respect to which it is desired to monitor the locked or unlocked conditions of various doors and windows, and/or to note the presence of something such as a fire. Central monitoring station 20 might well comprise some more centrally located building on the campus, wherein it is convenient for a security superintendent to monitor incoming information about conditions in the remote building. In the particular embodiment of the systems described and illustrated herein, common transmission medium 16 comprises a single pair of conventional telephone wires, leased from the appropriate telephone company.

Speaking somewhat more specifically about system 10, transmitter 12 is adapted to be, and is, connected to a plurality of signaling devices, such as devices 22, 24 through a plurality of signal-gating circuits, such as those shown at 26, 28, which form part of the transmitter. As can be seen, devices 22, 24 are connected to circuits 26, 28 respectively. The signaling devices might typically comprise normally closed electrical switches which open in response to certain events, such as the releasing of a lock, the opening of a door or window, or the buildup of temperature in an area. In the system being described, the signaling devices comprise such switches, and are hereinafter referred to simply as switches. With a switch closed, it may be thought of as being in a nonsignaling state. When open, it may be thought of as being in a signaling state.

Receiver 14 is adapted to be, and is, connected to a plurality of indicating devices, such as devices 30, 32 through a plurality of output circuits, such as circuits 34, 36 which form part of the receiver. Devices 30, 32 are connected to circuits 34, 36 respectively. The indicating devices herein comprise, and are hereinafter referred to as, lamps. When a lamp is unlit, it is referred to as being in a nonindicating state; when lit, it is referred to as being in an indicating state. The output circuits are referred to herein collectively as output circuit means.

Switch 22 is associated with lamp 30, and switch 24 is associated with lamp 32. More specifically, with switch 22 closed, lamp 30 is intended to be unlit; and with switch 22 open, lamp 30 is intended to be lit. The same is true with respect to switch 24 and lamp 32. Thus, lamps 30, 32 are intended to indicate the conditions of switches 22, 24, respectively.

While only two different pairs of associated signaling and indicating devices are illustrated, it should be appreciated that a great many more such pairs are in fact connected to the system. In particular, system 10 accommodates fourteen such pairs of such associated devices. It should be understood, of course, that systems similar to system 10, and also constructed according to the invention, may be made which will accommodate a greater or a lesser number of signaling and indicating devices.

Explaining very briefly and simply how the overall system performs, transmitter 12 operates in successive recurrent operating cycles. During each such cycle, it scans the switches one after another to determine their respective conditions. During such an operating cycle, the transmitter produces and supplies to the transmission medium a train of time-spaced indexing pulses, one from each of the different pairs of associated switches and lamps. After each such indexing pulse, and if the switch associated with that pulse is then open, the transmitter supplies the transmission medium with an appropriate signaling pulse (also called herein an information signal). As will be more fully explained, the indexing and signaling pulses produced by the transmitter comprise voltage pulses which differ in their respective maximum voltage levels.

Receiver 14, in response to recieved indexing pulses, tracks or follows the transmitter in recurrent operating cycles of its own. During such an operating cycle, the receiver scans the different lamps connected to it. According to one embodiment of the invention, the receiver, on receiving a signaling pulse, produces an output signal which causes the lamp which is associated with the immediately preceding indexing pulse to light up. According to a modification of the system, the receiver is prevented from effecting any change in the condition of a lamp until it is determined (at the end of a train of indexing pulses) that the transmitter and receiver were synchronized at the time of receipt of a signaling pulse.

The transmitter and receiver repeat rapidly their cyclic operations, keeping information with respect to the conditions of the various switches essentially current.

Transmitter Construction

Figure 2:
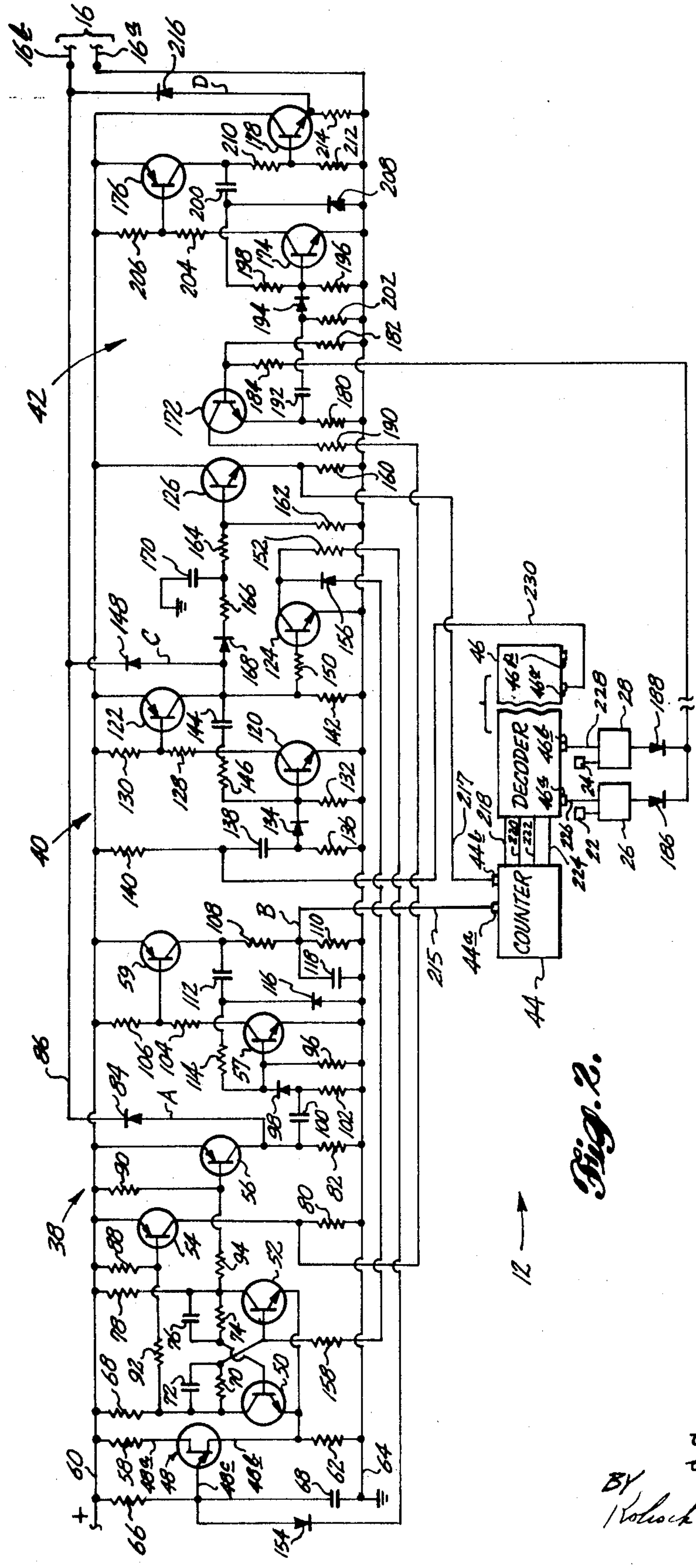
FIG. 2 is a circuit diagram illustrating details of a transmitter in the system of FIG. 1.

Transmitter 12 is illustrated in detail in FIG. 2. In general terms, the transmitter includes an index-pulsing circuit, or means, 38, a synchronizing pulse circuit 40, and a signal-pulsing circuit, or means, 42. In addition, transmitter 12 includes a conventional A–B–C–D binary counter 44, a conventional A-B-C-D binary decoder 46, and 14 signal-gating circuits, such as circuits 26, 28 mentioned above. Counter 44 and decoder 46 together comprise what is referred to herein as a pulse-responsive indexing means.

Index-pulsing circuit 38 includes transistors 48, 50, 52, 54, 56, 57, 59. Transistor 48 is what is known as a unijunction transistor, and includes a pair of bases *48a*, *48b*, and an emitter *48c*. The other transistors mentioned include the usual emitter, base and collector. Transistor 48, together with its associated circuit components, performs as an oscillator in the transmitter, with base *48a* connected through a resister 58 to a positive voltage supply conductor 60, and with base *48b* connected through a resistor 62 to a grounded conductor 64. Conductor 60 is connected to the positive terminal of a suitable source of D. C. voltage—the other side of this source being grounded. In the system being described, the voltage on conductor 60 is about +20 volts. Emitter *48c* is connected through a resistor 66 to conductor 60, and through a capacitor 68 to conductor 64.

Transistors 50, 52 are connected to perform as a bistable-type multivibrator. The emitters of these transistors are connected directly together, and are connected through resistor 62 to conductor 64. The collector of transistor 50 is connected to conductor 60 through a resistor 68, and is connected to the base of transistor 52 through the parallel combination of a resistor 70 and a capacitor 72. The base of transistor 50 is connected through the parallel combination of a resistor 74 and a capacitor 76 to the collector of transistor 52. Positive voltage from conductor 60 is supplied the collector of transistor 52 through a resistor 78.

The emitters of transistors 54, 56 are each connected directly to conductor 60, and the collectors of these transistors are connected through resistors 80, 82, respectively, to conductor 64. The collector of transistor 56 is, in addition, connected through a diode 84 to a conductor 86. The bases of transistors 54, 56 are connected to conductor 60 through resistors 88, 90, respectively, and to the collectors of transistors 50, 52, respectively, through resistors 92, 94, respectively.

Following along conductors 64, 86 to the right in FIG. 2, it will be noted that these conductors are connected to conductors 16*a*, 16*b*, respectively, which comprise the telephone wires mentioned earlier that make up transmission medium 16.

Transistors 57, 59 in the index-pulsing circuit are connected to perform as what is called a one-shot multivibrator. The emitter of transistor 57 is connected directly to conductor 64. The base of the transistor is connected to this conductor through a resistor 96, and is connected to the collector of transistor 56 through the series combination of a diode 98 and a capacitor 100. The junction between diode 98 and capacitor 100 is connected to conductor 64 through a resistor 102. The collector of transistor 57 is supplied positive voltage through a pair of series-connected resistors 104, 106. Transistor 59 has its emitter connected directly to conductor 60, and its base connected to the junction between resistors 104, 106. The collector of transistor 59 is connected through series resistors 108, 110 to conductor 64, and through series-connected capacitor 112 and resistor 114 to the base of transistor 57. A diode 116 connects the junction between capacitor 112 and resistor 114 to conductor 64. A capacitor 118 connects the junction between resistors 108, 110 to conductor 64.

Synchronizing pulse circuit 40 includes transistors 120, 122, 124, 126. Transistors 120, 122 are connected to perform as a one-shot multivibrator. The emitter of transistor 120 is connected directly to conductor 64, and the collector of the transistor is connected through series resistors 128, 130 to supply conductor 60. The base of transistor 120 is connected through a resistor 132 to conductor 64, and through a diode 134 to the junction between a resistor 136 and a capacitor 138, which are in series with another resistor 140 between conductors 60, 64. The emitter of transistor 122 is connected directly to supply conductor 60, and the base of the transistor is connected to the junction between resistors 128, 130. Transistor 122 has its collector connected through a resistor 142 to conductor 64, and through the series combination of a capacitor 144 and a resistor 146 to the base of transistor 120. In addition, the collector of transistor 122 is connected through a diode 148 to previously mentioned conductor 86.

The emitter of transistor 124 is connected directly to conductor 64, and the base of this transistor is connected through a resistor 150 to the collector of transistor 122. Transistor 124 has its collector connected to emitter 48*c* of transistor 48 and to the base of transistor 52. More specifically, the collector of transistor 124 is connected to emitter 48*c* through a series circuit including a resistor 152 and a diode 154. The collector is connected to the base of transistor 52 through a series circuit including a diode 156 and a resistor 158.

The collector of transistor 126 is connected directly to supply conductor 60, and the emitter of this transistor is connected to conductor 64 through a resistor 160. The base of transistor 126 is connected through a resistor 162 to conductor 164, and through a series circuit including resistors 164, 166 and a diode 168 to the collector of transistor 122. The junction between resistors 164, 166 is grounded through a capacitor 170.

Signal-pulsing circuit 42 includes transistors 172, 174, 176, 178. The emitter and base of transistor 172 are connected to conductor 64 through resistors 180, 182, respectively. In addition, the base of this transistor is connected through a resistor 184, and through parallel-connected diodes, such as diodes 186, 188, to the output terminals of the various signal-gating circuits, such as circuits 26, 28. As can be seen, the anode of diode 186 is connected to the output terminal of circuit 26, and the anode of diode 188 is connected to the output terminal of circuit 28. The collector of transistor 172 is connected through a resistor 190 to the collector of previously mentioned transistor 54. The base and collector of transistor 172 are referred to herein also as input terminals.

Transistors 174, 176 are connected to operate as a one-shot multivibrator. The base of transistor 174 is connected to the emitter of transistor 172 through a capacitor 192 and a diode 194 which are in series. In addition, the base of this transistor is connected to conductor 64 through a resistor 196, and is connected to the collector of transistor 176 through the series combination of a resistor 198 and a capacitor 200. The junction between capacitor 192 and diode 194 is connected to conductor 64 through a resistor 202. The emitter of transistor 174 is connected directly to conductor 64, and the collector of the transistor is connected through series resistors 204, 206 to supply conductor 60. The junction between resistor 198 and capacitor 200 is connected through a diode 208 to conductor 64. Transistor 176 has its emitter connected directly to conductor 60, its base connected directly to the junction between resistors 204, 206, and its collector connected to conductor 64 through series resistors 210, 212.

The collector of transistor 178 is connected directly to supply conductor 60, the base is connected directly to the junction between resistors 210, 212, and the emitter is connected through a resistor 214 to conductor 64. In addition, the emitter of this transistor is connected through a diode 216 to conductor 86.

As was mentioned earlier, counter 44 and decoder 46 are conventional electronic devices, and preferably comprise integrated circuit type devices. The reason for this preference is that integrated circuit devices are very compact, and extremely fast in their internal operations.

The counter has a pair of input terminals, including a counting input terminal 44*a* and a reset input terminal 44*b*. Terminal 44*a* is connected through a conductor 215 to the junction between resistors 108, 110. Terminal 44*b* is connected through a conductor 217 to the emitter of transistor 126. Further, the counter has the usual four output terminals (not specifically designated) connected through conductors 218, 220, 222, 224 to the customary four input terminals (also not specifically designated) of decoder 46.

Each time that the voltage applied to input terminal 44*a* in the counter changes from a positive voltage (above about one volt) to ground, the counter records a count, and makes an appropriate change in the voltage states on its four output terminals. The mechanism by which such action occurs in the counter is, of course, well understood by those skilled in the art. With the counter having four output terminals, it is capable of indicating a count from zero through 15, inclusive. At any time during the operation of the counter should the voltage applied to input terminal 44*b* change from ground level to a positive level (above about one volt or so), the counter is placed in a zero-count condition.

As was just mentioned above, decoder 46 includes four input terminals which are connected to the four output terminals of the counter. The decoder additionally includes 16 output terminals, fifteen of which are employed herein. Three of these employed terminals are indicated at 46*a*, 46*b*, 46*o*. Terminals 46*a*, 46*b* are connected through conductors 226, 228, respectively, to signal-gating circuits 26, 28, respectively. Terminal 46*o* is connected through a conductor 230 to the junction between previously mentioned capacitor 138 and resistor 140 in the synchronizing pulse circuit. Terminals 46*a*, 46*b* may be thought of as the first and second output terminals, respectively. Terminal 46*o* may be thought of as the fifteenth output terminal. The other 12 employed output terminals (not illustrated) of the decoder are, like terminals 46*a*, 46*b*, connected to different ones of the remaining twelve nonillustrated signal-gating circuits mentioned earlier. The sixteenth output terminal of the decoder, indicated at 46*p*, is not employed herein.

The decoder responds in a well known manner to changes in the voltage conditions on its four input terminals to make appropriate related changes in the voltage conditions on its output terminals. More specifically, with counter 44 in a zero-count state, a positive voltage (typically about +5 volts) exists on each of the first 15 output terminals—i.e., all except terminal 46*p* which then is substantially at ground potential. When the counter has recorded a count of "one" (resulting from a voltage change as described earlier on terminal 44*a*), the voltage on output terminal 46*p* rises to the positive level just mentioned, and that on output terminal 46*a* drops to ground. The voltages on the other output terminals of the decoder, however, remain unchanged. When the count in the counter increases to "two," the voltage on output terminal 46*a* returns to the positive level which it had previously, and the voltage on the output terminal 46*b* drops to ground. The voltages on the other output terminals of the decoder remain unchanged. This procedure then continues in a similar manner with respect to the other output terminals of the decoder as the counter continues to count. Thus, when a count of fifteen is recorded, the voltage on output terminal 46*o* drops to ground with the all of the other output terminals of the decoder then at the positive voltage level mentioned above.

With counter 44 storing a particular count, and decoder 46 producing a set of voltage conditions at its output terminals reflecting this count, the counter and decoder may be thought of as being in an indexed state. And, from the foregoing description, it will be obvious, that there is a different indexed state associated with each signaling device switch (and with the switch's associated indicating lamp).

Figures 3, 6, 7:
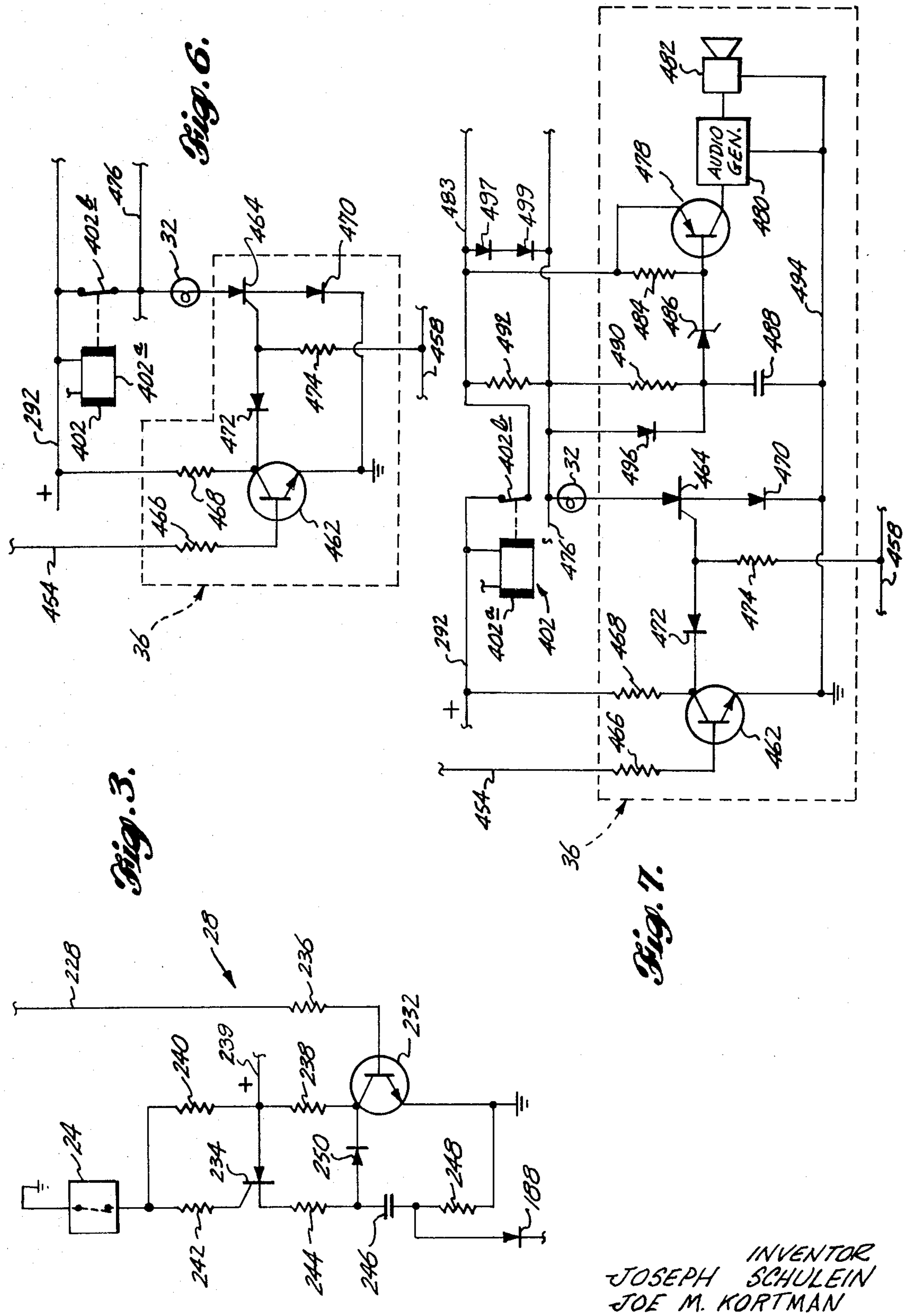
FIG. 3 is a circuit diagram illustrating details of a signal-gating circuit employed in the transmitter of FIG. 2.
FIGS. 6 and 7 are circuit diagrams illustrating details of two different modifications of an output circuit employed in the receiver of FIG. 5.

The various signal-gating circuits employed in the transmitter are substantially the same in construction, and referring to FIG. 3, this figure illustrates the details of circuit 28. Circuit 28 includes a transistor 232 and a silicon-controlled rectifier 234. The emitter of transistor 232 is grounded, and the base is connected through a resistor 236 to previously mentioned conductor 228. It will be recalled that conductor 228 is connected to output terminal 46*b* of decoder 46 (see FIG. 2). The collector of transistor 232 is connected through a resistor 238 to a positive voltage supply conductor 239, and is connected through resistor 238 and a resistor 240 to one side of switch 24. The other side of the switch is grounded. Conductor 239 is connected to a suitable source of positive voltage, which may be the same source previously mentioned herein.

Rectifier 234 has its anode connected to conductor 239, and its gate connected through a resistor 242 to the junction between switch 24 and resistor 240. The cathode of rectifier 234 is connected to ground through a series circuit including a resistor 244, a capacitor 246, and another resistor 248. A diode interconnects the junction between resistor 244 and capacitor 246 and the collector of transistor 232. The junction between capacitor 246 and resistor 248 is connected to the anode of previously mentioned diode 188.

With a positive voltage on conductor 228, transistor 232 conducts. On opening of switch 24, even momentarily, and with transistor 232 conducting, rectifier 234 switches from a nonconducting to a conducting state. With dropping of the voltage on conductor 228 to ground, transistor 232 stops conducting, whereupon a positive voltage pulse, which lasts for about 0.01 seconds, is produced at the junction between capacitor 246 and resistor 248, which junction constitutes an output terminal for circuit 28. This pulse is supplied through diode 188, and is referred to as an instruction signal herein. Turning off of transistor 232, of course, returns rectifier 234 to a nonconducting state.

Reapplication of a positive voltage to conductor 228 causes transistor 232 to turn back on. And, if switch 24 is still open at this time, rectifier 234 returns to a conducting state.

Similar operation characterizes all of the other signal-gating circuits in the transmitter.

Transmitter Operation

Figure 4:
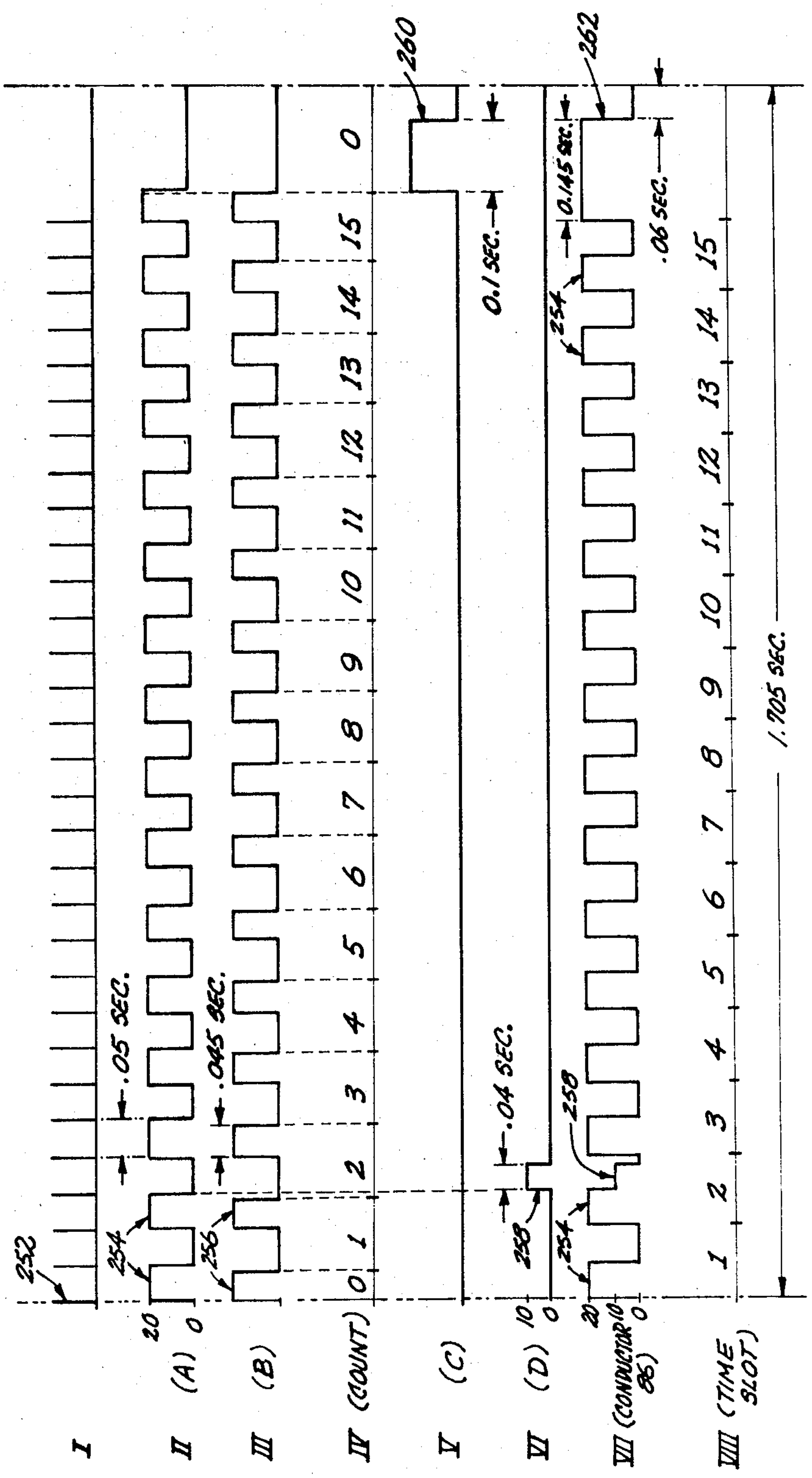
FIG. 4 illustrates in simplified graphic form, and on a common time scale, representations of various voltages and other conditions which exist at various points in the circuit of FIG. 2.

Explaining how transmitter 12 as a whole performs, this is best done in conjunction with FIGS. 2, 3 and 4. Let us assume initially that the transmitter is about to begin an operating cycle, and that during the forthcoming cycle only switch 24 (of the various signaling device switches) is open.

At the beginning of the cycle, counter 44 is in a zero-count condition. Thus, all of the decoder output terminals have positive voltages on them. Within the various signal-gating circuits, all of the transistors, corresponding to transistor 232 in circuit 28, are turned on. Within circuit 28, in addition, rectifier 234 is conducting. The corresponding rectifiers in the other signal-gating circuits, however, are not conducting.

As was mentioned above in the descriptions of the drawing figures, FIG. 4 represents graphically different voltages and other conditions that exist at different times in the transmitter. More specifically, it represents such voltages and conditions that occur in a single operating cycle of the transmitter —the left side of the drawing representing the beginning of such a cycle, and the right side of the drawing representing the end of a cycle. Counting down from the top of FIG. 4, it will be noted that there are eight different graphs, numbered I-VIII, inclusive. Graph I represents the output voltage produced at base 48b of transistor 48. Graph II represents the voltage produced at point A in FIG. 2, which is on the collector of transistor 56. Graph III represents the voltage produced at point B in FIG. 2, which is at the junction between resistors 108 and 110. Graph IV represents the particular count stored in counter 44 during different time intervals in the transmitter's operating cycle. Graph V represents the voltage produced at point C in FIG. 2, which is on the collector of transistor of 122. Graph VI represents the voltage produced at point D in the circuit of FIG. 2, which is on the emitter of transistor 128. Graph VII represents the voltage on conductor 86. And Graph VIII indicates the time intervals of so-called time slots during an operating cycle of the transmitter.

Further describing conditions which exist in the transmitter at the beginning of an operating cycle, transistor 48 is turned off, and capacitor 68 is just charged to the voltage necessary to initiate conduction in this transistor. All of the other transistors shown in FIG. 2, except for transistors 50, 54, are also initially turned off. Capacitor 138 is charged.

At the beginning of an operating cycle and with capacitor 68 charged as just mentioned, transistor 48 fires, or conducts, for a very brief interval, discharging this capacitor. With such conduction of transistor 48, a short-duration positive voltage spike, at substantially the full voltage level of the voltage on supply conductor 60, is supplied from base 48b to the emitters of transistors 50, 52. Referring to FIG. 4, Graph I, such a spike, at the beginning of the operating cycle, is indicated at 252. With discharging of capacitor 68, of course, transistor 48 stops conducting, and the capacitor begins charging again. When the capacitor again becomes charged sufficiently, transistor 48 again fires—as before. The time required for this to occur is determined substantially by the resistance of resistor 66 and the capacitance of capacitor 68. In transmitter 12 this time comprises about 0.05 seconds.

It will thus be apparent that a series of positive voltage spikes 252 (see FIG. 4, Graph I), at a rate of about 20 spikes-per-second, is supplied the emitters of transistors 50, 52.

With the occurrence of the first such voltage spike in an operating cycle, transistor 50 stops conducting and transistor 52 starts conducting. As a consequence, transistor 54 stops conducting and transistor 56 starts conducting. With conduction of transistor 56, the voltage on the collector (point A in FIG. 2 —Graph II) of transistor 56 rises abruptly from ground potential to substantially the full voltage (+20 volts herein) on conductor 60. This situation remains until the next spike 252 occurs, whereupon transistors 50, 54 return to conducting states, and transistors 52, 56 return to nonconducting states. When this occurs, the voltage at point A returns abruptly to ground potential.

It will thus be apparent (see FIG. 4, Graph II) that this type of operation results in a series of rectangular-wave positive-voltage pulses 254 occurring at point A. Each of these pulses has a maximum voltage level of about +20 volts, and lasts for an interval of about 0.05 seconds, with each pulse spaced in time from the preceding and succeeding pulses by an interval of about 0.05 seconds. Pulses 254 constitute time-spaced indexing pulses herein. These indexing pulses are applied through diode 84 to conductor 86.

Referring for a moment to Graph VIII in FIG. 4, it will be noted that the first indexing pulse in an operating cycle, together with the time interval that follows this pulse and precedes the second indexing pulse, define the first so-called time slot in the operating cycle. Similarly, the second indexing pulse, together with the time interval following it, define the second time slot in the cycle—and so on with respect to the succeeding indexing pulses and time intervals, up through and including the fifteenth indexing pulse and succeeding time interval.

Each time that transistor 56 switches into conduction, a positive voltage spike is applied through capacitor 100 and diode 98 to the base of transistor 57. This spike is effective to operate, or "fire," the one shot multivibrator comprising transistors 57, 59 and associated components. More specifically, the spike applied to the base of transistor 57 turns this transistor on, which then turns on transistor 59. And, with turning on of transistor 59, the voltage at the junction between resistors 108, 110 (point B in FIG. 2—Graph III) rises abruptly from ground potential to some positive voltage. Also, with conduction of transistor 59, capacitor 112 charges, and initially maintains transistor 57 in a conducting state. However, with sufficient charging of capacitor 112, the voltage on the base of transistor 57 drops below that which is necessary to maintain conduction in this transistor, and transistor 57 consequently turns off. Such turning off of transistor 57 occurs about 0.045 seconds after initial turning on of this transistor. With turning off of transistor 57, transistor 59 also turns off, and abruptly returns the voltage at point B to ground potential.

Referring to Graph III in FIG. 4, it will be seen that the voltage at point B throughout most of an operating cycle of the transmitter thus comprises a series of rectangular-wave positive-voltage pulses, such as pulses 256—one for each of the indexing pulses. Each pulse 256 begins at substantially the same time as an indexing pulse, lasts for about 0.045 seconds, and except for the last such pulse in an operating cycle, is followed by a time interval of about 0.055 seconds before the next pulse 256.

Pulses 256 are applied to input terminal 44a of counter 44. The trailing edges of these pulses, i.e. those edges at which the voltage of the pulse drops, are the portions of the pulses which effect a change in the condition of counter 44. More specifically, the trailing edge of each pulse 256 causes the counter to record a new count. Thus, and referring to Graph IV in FIG. 4, it will be observed that at the time of occurrence of the trailing edge of the first pulse 256, the count in counter 44 changes from zero to one, that at the time of occurrence of the trailing edge of the second pulse 256 in an operating cycle, the count in the counter changes from one to two, and so on through and including the time of occurrence of trailing edge of the fifteenth pulse 256, at which time the count in the counter changes from 14 to 15. On the occurrence of the trailing edge of the sixteenth pulse 256 in an operating cycle, the count in counter 44 changes from 15 back to zero.

As has previously been discussed, with the counter in different successive conditions indicating counts of zero through fifteen, inclusive, the respective associated output terminals of decoder 46 are placed successively in conditions with a ground potential rather than a positive voltage on them.

It will thus be apparent that the combination of counter 44 and decoder 46 responds, in effect, to the various indexing pulses produced at the collector of transistor 56, and with respect to each such indexing pulse switches successively to what have been referred to earlier as different indexed states. While it is in fact the case that counter 44 and decoder 46 respond to the trailing edges of pulses 256, rather than directly to pulses 254, pulses 256 are produced by and directly related to pulses 254. It will be noted that, with respect to time, a change occurs in the count of counter 44 0.045 seconds after the beginning of each indexing pulse 254, or 0.005 seconds before the end of the pulse.

As has previously been mentioned, each so-called indexed state of the counter and decoder results with a particular count stored in the counter and with a ground potential voltage existing on the corresponding output terminal of the decoder. As the series, or train, of indexing pulses occurs in an operating cycle of the transmitter, a sort of scanning operation thus occurs at the output terminals of the decoder. This scanning operation comprises the successive placement of the different output terminals of the decoder, beginning with terminal **46*a* and ending with terminal 46*p*, in conditions temporarily with ground level voltage potential on them. The time period that a particular decoder output terminal has a ground level potential on it occurs substantially simultaneously with the time period that the corresponding count is stored in counter 44. In other words, as long as the count in counter 44 is zero, a ground potential exists at terminal 46*p*; as long as the count in counter 44 is one, a ground potential exists at terminal 46*a*; as long as the count in counter 44 is two, a ground potential exists at terminal 46*b***; and so on.

With the voltages at the different output terminals of the decoder changing successively as indicated during each operating cycle of the transmitter, the transistors in the various signal-gating circuits, corresponding to transistor 232 in circuit 28, are turned off (and then back on again) in succession. The turning off and on of such a transistor in a signal-gating circuit produces no further effect in the event that the signaling device switch connected to the circuit is closed. However, and as was briefly explained earlier, if a signaling device switch is open, then, when the transistor in the associated signal-gating circuit is turned off, a positive voltage pulse (about 0.01 seconds long) is produced at the output terminal of the circuit, and is supplied to the base of transistor 172. Since it has been assumed for the purpose of the present operational description that only switch 24 is open, only circuit 28 is in a condition to produce such a pulse.

It will be recalled that transistor 54 conducts during the interval following an indexing pulse. When it conducts, the voltage on its collector rises from essentially a ground potential to substantially the full positive voltage on conductor 60. Thus, and since the collector of transistor 54 is connected through resistor 190 to the collector of transistor 172, the voltage on the collector of transistor 172 follows that on the collector of transistor 54. Consequently, at the conclusion of an indexing pulse, when the voltage on the collector of transistor 54 becomes positive, a positive voltage is supplied the collector of transistor 172 which places this transistor in a condition ready to conduct should a positive voltage then be applied to its base. Following each indexing pulse, therefore, transistor 172 is placed in a condition ready to conduct should a positive voltage pulse be supplied its base from the output terminal of any one of the signal-gating circuits. And, since in the operating cycle being described only circuit 28 is in a condition to produce a positive voltage pulse, only one such pulse will be applied to the base of transistor 172—such pulse extending from a point in time 0.005 seconds before transistor 172 is ready to conduct immediately following the second indexing pulse, to a point in time 0.005 seconds after the transistor is ready to conduct.

Thus, and under the conditions which have just been outlined, transistor 172 conducts momentarily immediately following the trailing edge of the second indexing pulse 254 in the operating cycle. With conduction of transistor 172 a positive voltage pulse is applied through capacitor 192 and diode 194 to the base of transistor 174. Such a pulse fires the multivibrator comprising transistors 174, 176. More specifically, transistor 174 turns on, and by so doing turns on transistor 176. With turning on of transistor 176, capacitor 200 begins to charge and for a time interval of about 0.04 seconds holds transistor 174 in a conducting state. At the end of this time interval, transistors 174, 176 both stop conducting.

With turning on of transistor 176 transistor 178 conducts. And, it will be apparent that transistor 178 conducts so long, and only so long, as transistor 176 continues to conduct. This period of time, as was just mentioned, is about 0.04 seconds. With conduction of transistor 178, a rectangular-wave positive voltage pulse is produced at its emitter (point D in FIG. 2), which pulse is applied through diode 216 to conductor 86. This voltage pulse, which is indicated generally at 258 in graph VI of FIG. 4, has a maximum voltage level of about +10 volts which, it will be noted, is about one half the maximum voltage level (about +20 volts) of indexing pulses 254. As can be seen clearly in graph VI, pulse 258 begins at essentially the same time that the second indexing pulse ends, and terminates about 0.01 seconds before the beginning of the third indexing pulse. Pulse 258 may thus be thought of as being interleaved (in time) between a pair of successive indexing pulses. Pulse 258 occurs within the second time slot in the operating cycle, and while a count of two is stored in counter 44.

Inasmuch as only switch 24 is open during the transmitter operating cycle now being considered, only one pulse 258 is produced during the operating cycle. Other pulses 258 would, of course, be produced in like manner, and during appropriate time slots, were other signaling device switches open.

On the occurrence of the trailing edge of the fifteenth pulse 256 in the operating cycle being described (which pulse is the second from the right in graph III of FIG. 4), the count in counter 44 changes from 14 to 15, and decoder 46 places a ground potential on its fifteenth output terminal 46o. This operation results in discharging of capacitor 138. Such discharging occurs within a time interval of 0.1 seconds. On the occurrence of the trailing edge of the sixteenth pulse 256 (which is the farthest to the right in graph III of FIG. 4), the count in counter 44 changes from fifteen to zero, and decoder 46 returns a positive voltage to terminal 46o. When this occurs, a positive voltage pulse is applied through conductor 230, capacitor 138, and diode 134 to the base of transistor 120.

This positive voltage pulse fires the one-shot multivibrator comprising transistors 120, 122. More specifically, transistor 120 turns on, and by so doing turns on transistor 122. With turning on of transistor 122, capacitor 144 begins to charge, with such charging holding transistor 120 in a conducting state. Transistors 120, 122 continue to conduct for a period of about 0.1 seconds, whereupon capacitor 144 becomes sufficiently charged to cause turning off of these transistors.

With conduction of transistor 122, a rectangular-wave positive voltage pulse is applied to its collector (point C in FIG. 2). This positive voltage pulse, indicated generally at 260 in graph V of FIG. 4, is applied through diode 148 to conductor 86, through resistor 150 to the base of transistor 124, and through diode 168 and resistors 166, 164 to the base of transistor 126. As can be seen in graph V, pulse 260 begins essentially at the same time that the sixteenth pulse 256 terminates, and lasts for about 0.1 seconds. The maximum voltage level of pulse 260 is about +20 volts.

With application of pulse 260 to the base of transistor 124, and throughout the duration of the pulse, transistor 124 conducts. Because of the connection, through resistor 152 and diode 154, between the collector of transistor 124 and the junction between resistor 66 and capacitor 68, such conduction of transistor 124 prevents charging of capacitor 68, and thus holds transistor 48 in a nonconducting state. This inhibits the generation of voltage spikes 252 at base 48b. Referring to graph I of FIG. 4, it will be noted that the last voltage spike 252 in the operating cycle being described, i.e., the spike which is the farthest to the right in FIG. 4, is the one which generated the sixteenth pulses 254, 256.

Conduction of transistor 124, also causes transistor 52 to return to a nonconducting state. This is because of the connection, through diode 156 and resistor 158, between the collector of transistor 124 and the base of transistor 52. Such turning off of transistor 52 occurs almost immediately after turning on of transistor 124. As a consequence, the sixteenth indexing pulse 254 is somewhat shorter in duration than the other indexing pulses.

With application of pulse 260 to the base of transistor 126, this transistor conducts and applies a positive voltage pulse through conductor 217 to reset input terminal 44b of counter 44. This pulse positively holds counter 44 to a zero-count condition.

On termination of pulse 260, transistors 124, 126 stop conducting. With turning off of transistor 124, capacitor 68 begins to charge, and 0.06 seconds later causes transistor 48 to fire, which firing initiates the next successive operating cycle of the transmitter. The reason that 0.06 seconds is required, rather than 0.05 seconds, to change capacitor 68 sufficiently to fire transistor 48, is that turning on of transistor 124 as just previously described, substantially fully discharges the capacitor. Firing of transistor 48 only partially discharges the capacitor, and more specifically, only discharges it to a point where 0.05 seconds recharging time is thereafter required before it will again fire the transistor.

Referring to graph VII of FIG. 4, this shows the voltage which occurs with time on conductor 86 during the transmitter operating cycle which has just been described. As can be seen, this voltage comprises 15 time-spaced indexing pulses 254, a pulse 258, constituting a signaling pulse herein, interleaved between the second and third indexing pulses in the cycle, and a relatively long pulse 262 near the end of the operating cycle. Pulse 262 is made up of pulse 260, and the sixteenth (shortened) pulse 254 (produced at point A). Pulse 262 lasts for about 0.145 seconds. This pulse is followed by a time interval of about 0.06 seconds before the beginning of the next operating cycle.

Transmitter 12, while operating, thus regularly transmits, and supplies to telephone wires 16a, 16b, recurrent trains of time-spaced indexing pulses, followed by a long pulse (262). In addition, and in accordance with the respective conditions of the signaling device switches, the transmitter transmits signaling pulses during time intervals between successive adjacent indexing pulses. The maximum voltage level of the indexing pulses is greater than that of signaling pulses, and in the particular system described herein, is about twice the maximum voltage level of signaling pulses. Indexing pulses occur at a rate of about ten pulses per second. An operating cycle of the transmitter lasts for about 1.705 seconds.

Receiver Construction

Figure 5:
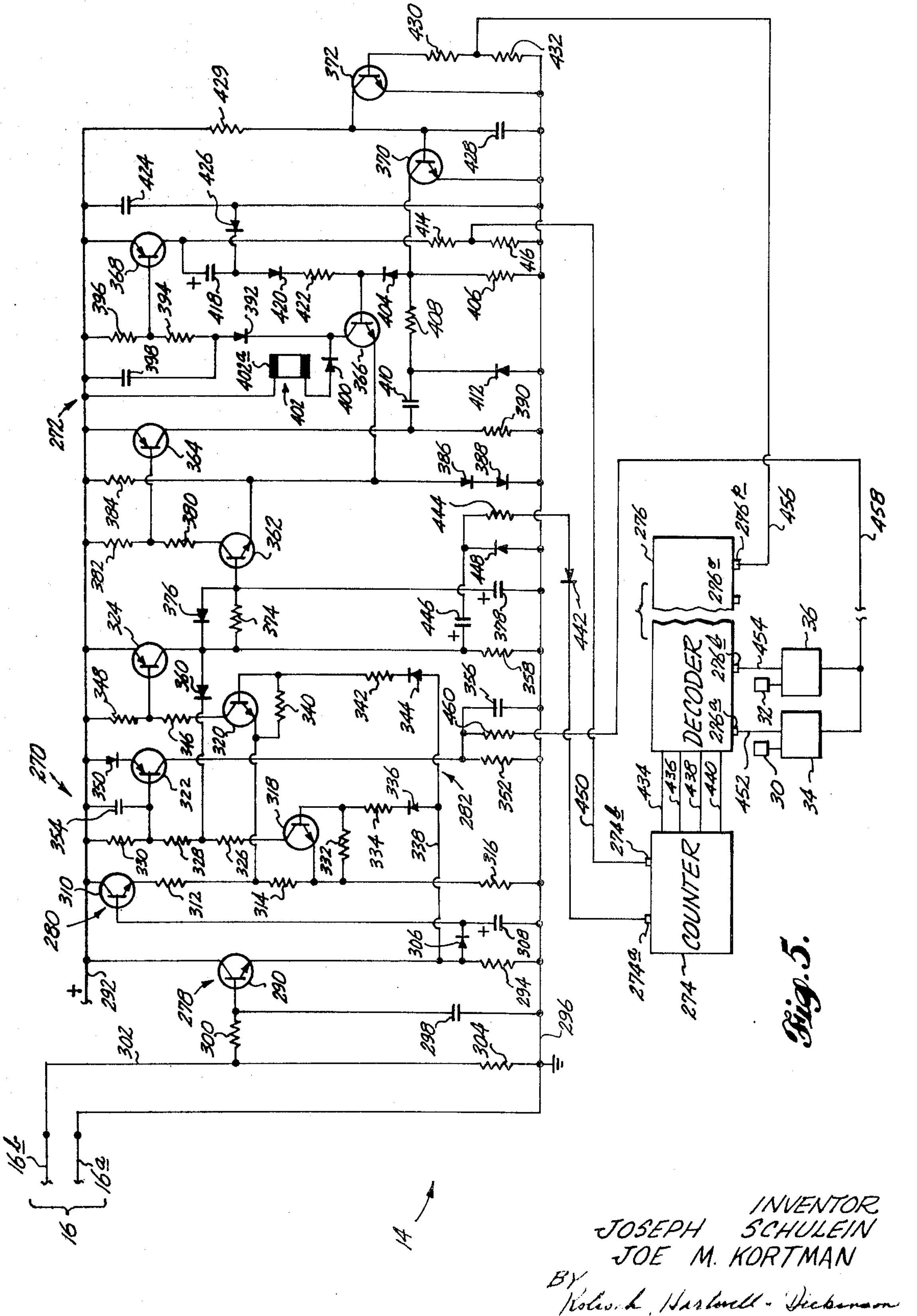
FIG. 5 is a circuit diagram illustrating details of a receiver in the signaling system of FIG. 1.

Details of receiver 14 are illustrated in FIG. 5. In general terms, the receiver includes a pulse-height discriminator circuit 270, and a circuit, or synchronizing means, 272 which assists (as will be more fully explained) in assuring synchronization between the transmitter and receiver. In addition, receiver 14 includes a conventional A–B–C–D binary counter 274, a conventional A–B–C–D binary decoder 276, and output circuits such as circuits 34, 36 mentioned earlier. Counter 274 and decoder 276 are substantially the same construction as previously described counter 44 and decoder 46, respectively, and together comprise what is referred to herein as another pulse-responsive indexing means.

Pulse-discriminator circuit 270 includes a reference voltage producer 278, a voltage divider circuit 280, and a circuit, or comparing circuit means, 282.

Reference voltage producer 278 comprises a transistor 290 having its collector connected to a positive voltage supply conductor 292, and its emitter connected through a resistor 294 to a grounded conductor 296 which is connected to previously mentioned telephone wire 16a. Conductor 292 is connected to the positive side of a suitable source of DC voltage, the other side of which is grounded. The base of transistor of 290 is bypassed to ground through a capacitor 298, and is connected through a resistor 300 and a conductor 302 to previously mentioned telephone wire 16b. The junction between resistor 300 and conductor 302 is grounded through a resistor 304. Conductor 302 constitutes an input terminal herein for the receiver. Also included in the reference voltage producer are a diode 306 and a capacitor 308. Diode 306 has its anode connected to the emitter of transistor 290 and its cathode connected to one side of capacitor 308. The other side of capacitor 308 is connected to conductor 296.

Voltage divider circuit 280 includes a transistor 310. This transistor has its collector connected directly to supply conductor 292, and its base connected directly to the junction between diode 306 and capacitor 308. The emitter of transistor 310 is connected to conductor 296 through three series-connected resistors shown at 312, 314, 316.

Circuit 282 includes transistors 318, 320, 322, 324. Transistors 318, 320 and their respective associated components are each referred to herein as a comparing circuit. Transistor 322 and its associated components comprises an inhibit means herein.

Transistor 318 has its emitter connected to the junction between resistors 314, 316, and its collector connected to conductor 292 through three series-connected resistors 326, 328, 330. The emitter of this transistor constitutes an input terminal for circuit 282. The base of transistor 318 is connected through a resistor 332 to the junction between resistors 314, 316, and through the series combination of a resistor 334 and a diode 336 to a conductor 338 which is connected to the emitter of previously described transistor 290. Conductor 338 constitutes another input terminal for circuit 282.

The emitter of transistor 320 (which constitutes yet another input terminal for the circuit 282) is connected directly to the junction between resistors 312, 314, and further, is connected through the series combination of resistors 340, 342 and a diode 344 to conductor 338. The base of transistor 320 is connected directly to the junction between resistors 340, 342, and the collector of the transistor is supplied positive voltage from conductor 292 through series resistors 346, 348.

Transistor 322 has its emitter connected through a diode 350 to supply conductor 292, its base connected directly to the junction between resistors 328, 330, and its collector connected through a resistor 352 to conductor 296. A capacitor 354 interconnects the base of the transistor and conductor 292. A capacitor 356 interconnects the collector of the transistor and conductor 296.

Transistor 324 has its emitter connected directly to supply conductor 292, its base connected directly to the junction between resistors 346, 348, and its collector connected through a resistor 358 to conductor 296. In addition, the collector of transistor 324 is connected through a diode 360 to the junction between resistors 326, 328.

Output signals from circuit 282 are produced at the collectors of transistors 318, 320.

Circuit 272 includes transistors 362, 364, 366, 368, 370, 372. The base of transistor 362 is connected through the parallel combination of a resistor 374 and a diode 376 to the collector of transistor 324, and in addition is connected through a capacitor 378 to conductor 296. The collector of this transistor is connected through series-connected resistors 380, 382 to supply conductor 292. The emitter of transistor 362 is connected to the junction between a resistor 384 and a pair of series-connected diodes 386, 388. Resistor 384 connects this junction to conductor 292, and diodes 386, 388 connect the junction to conductor 296.

Transistor 364 has its emitter connected directly to supply conductor 292, its base connected directly to the junction between resistors 380, 382, and its collector grounded through a resistor 390.

Transistors 366, 368 perform as a one-shot multivibrator in the receiver. The emitter of transistor 366 is connected directly to the emitter of transistor 362, and the collector of transistor 366 is connected to supply conductor 292 through a series circuit including a diode 392 and a pair of resistors 394, 396. The junction between diode 392 and resistor 394 is connected through a capacitor 398 to conductor 292. In addition, the collector of this transistor is connected through a diode 400 to one side of the coil **402*a* in a solenoid 402—the other side of this coil being connected to supply conductor 292. The function of solenoid 402 will be more fully explained later. The base of transistor 366 is connected to conductor 296 through the series combination of a diode 404 and a resistor 406. The junction between this diode and resistor is connected to the collector of transistor 364 through the series combination of a resistor 408 and a capacitor 410. The junction between resistor 408 and capacitor 410 is grounded through a diode 412**.

The emitter of transistor 368 is connected directly to conductor 292, and the base of the transistor is connected directly to the junction between resistors 394, 396. The collector of this transistor is grounded through series-connected resistors 414, 416. In addition, the collector of transistor 368 is connected to the base of transistor 366 through a series circuit including a capacitor 418, a diode 420, and a resistor 422.

Interconnecting conductors 292, 296 immediately to the right of transistor 368 in FIG. 5 is a capacitor 424. The bottom side of this capacitor in the figure is connected through a diode 426 to the junction between capacitor 418 and diode 420.

Also interconnecting conductors 292, 296, somewhat to the right of capacitor 424 in FIG. 5, is a series circuit including a capacitor 428 and a resistor 429. Transistor 370 has its base connected directly to the junction between capacitor 428 and resistor 429, its emitter connected directly to conductor 296, and its collector connected directly to the junction between diode 404 and resistor 406. The collector of transistor 372 is connected directly to the junction between capacitor 428 and resistor 429. The emitter of this transistor is connected directly to conductor 296, and the base of the transistor is connected to conductor 296 through series-connected resistors 430, 432.

Considering now the counter and decoder in receiver 14, counter 274 includes a counting input terminal **274*a* and a reset input terminal 274*b* which correspond to terminals 44*a*, 44*b*, respectively, in previously described counter 44. Further, counter 274, like counter 44, includes four output terminals (not specifically designated) connected through conductors 434, 436, 438, 440 to the four input terminals (also not specifically designated) of the decoder 276. Counting input terminal 274*a* is connected to the collector of transistor 324 through a series circuit which includes a diode 442, a resistor 444, and a capacitor 446. A diode 448 interconnects conductor 296 and the junction between resistor 444 and capacitor 446. Reset input terminal 274***b* is connected through a conductor 450 to the junction between resistors 414, 416. Counter 274 performs in substantially the same way as counter 44.

Decoder 276, in addition to having the four input terminals just mentioned includes sixteen output terminals, 15 of which are employed herein. Three of these employed output terminals are indicated at 276*a*, 276*b*, 276*p*. Terminals 276*a*, 276*b* correspond to previously described terminals 46*a*, 46*b*, respectively, and are connected through conductors 452, 454, respectively, to output circuits 34, 36, respectively. Terminal 276*p*, which is the sixteenth output terminal of the decoder, is connected through a conductor 456 to the junction between resistors 430, 432. The other 12 employed output terminals (not illustrated) of decoder 276 are connected to different ones of the remaining twelve nonillustrated output circuits (mentioned earlier). Terminal 276*o*, which is the fifteenth output terminal, is not employed herein.

The output terminals of the various output circuits, such as of circuits 34, 36, are connected through a conductor 458 and a resistor 460 to the collector of previously described transistor 322.

The operation of decoder 276 is essentially the same as that described above for decoder 46. With counter 274 storing a particular count, decoder 46 produces a set of voltage conditions at its output terminals reflecting this count. More specifically, the decoder places a ground level voltage on the output terminal associated with the given count stored in the counter. Under such a circumstance, counter 274 and decoder 276 may be thought of as being in an indexed state. It will thus be apparent that, as in the case of counter 44 and decoder 46, counter 274 and decoder 276 are placable in a plurality of different indexed states, with each such state associated with a different associated signaling and indicating device.

The various output circuits employed in the receiver are substantially the same in construction. Referring to FIG. 6, this figure illustrates one modification of output circuit 36. Circuit 36 includes a transistor 462 and a silicon-controlled rectifier 464. The emitter of transistor 462 is grounded, and the base is connected to previously mentioned conductor 454 through a resistor 466. The collector of transistor 462 is supplied positive voltage from previously described supply conductor 292 through a resistor 468.

The cathode of rectifier 464 is connected to ground through a diode 470. The gate of the rectifier is connected through a diode 472 to the collector of transistor 462, and is connected through a resistor 474 to previously described conductor 458. The anode of rectifier 464 is connected to one side of lamp 32, the other side of which is connected to a conductor 476, the latter being connected to one side of normally closed switch 402*b* of previously mentioned solenoid 402. The other side of switch 402*b* is connected to conductor 292.

With solenoid 402*a* nonenergized, and switch 402*b* consequently closed, and with positive voltage applied through conductor 454 and resistor 466 to the base of transistor 462, this transistor conducts. Assuming that rectifier 464 is initially in a nonconducting state, conduction of transistor 462 holds the rectifier in this state.

With application of a ground potential to conductor 454, transistor 462 turns off. And, with turning off of this transistor, should a positive voltage then be applied to conductor 458, and from this conductor through resistor 474 to the gate of rectifier 464, rectifier 464 will switch to a conducting state and lamp 32 will become lit. If this occurs, rectifier 464 will remain in a conducting state thereafter regardless of the condition of transistor 462. However, if during a period of nonconduction of transistor 462 no such positive voltage is applied to conductor 458, and assuming that rectifier 464 is then not conducting, the rectifier will remain in a nonconducting state.

Under circumstances with rectifier 464 conducting, should solenoid coil 402*a* be energized, switch 402*b* will open and remove the supply of positive voltage to conductor 476. Such action will result in turning off of the rectifier and lamp. Conductor 476 is one that extends to all of the output circuits herein, and it is through this conductor that positive voltage is supplied to the lamps and silicon-controlled rectifiers associated with the different output circuits. Thus, should positive voltage be removed from conductor 476, any lamp which has been lit will turn off, and any silicon-controlled rectifier which is then conducting will stop conducting.

The operations of output circuit 34 and of the other output circuits are substantially identical to that just described for circuit 36.

Referring now to FIG. 7, this shows a modified form of output circuit as contemplated herein, and as in the case of FIG. 6, it illustrates details of output circuit 36 which is representative of the other output circuits. It will be noted that FIG. 7 includes all of the components illustrated in FIG. 6 interconnected in a similar manner (such components being designated by the same respective reference numerals), and in addition, includes several other components. These other components include a transistor 478, an audio generator 480 and a speaker 482. The base and emitter of transistor 478 are each connected to a conductor 483, the base being connected to this conductor through a resistor 484, and the emitter being connected directly thereto. Conductor 483 is connected to supply conductor 292 through switch 402*b*. The base of transistor 478 is, in addition, connected through a Zener diode 486 to a series circuit including a capacitor 488 and a pair of resistors 490, 492. More specifically, the base of transistor 478 is connected to the cathode of diode 486, and the anode of this diode is connected to the junction between capacitor 488 and resistor 490. The bottom side of capacitor 488 in FIG. 7 is connected to a grounded conductor 494. The upper end of resistor 490 in the figure is connected to conductor 476 and to the lower end of resistor 492. The upper end of resistor 492 is connected to conductor 483. A diode 496 is connected in parallel as shown with resistor 490, and series-connected diodes 497, 499 are connected in parallel with resistor 492 between conductors 483, 476.

Audio generator 480 is conventional, and thus is shown only in block form. One terminal of the generator is connected directly to the collector of transistor 478, and another terminal is connected directly to conductor 494. Still another terminal of the generator is connected to one side of the coil in speaker 482 (which is also a conventional device), the other side of this coil being grounded.

When energized, generator 480 produces an audio electrical signal at a frequency of about 1,000 Hertz, which drives speaker 482.

Considering briefly the operation of the circuitry shown in FIG. 7, the various components therein which are also included in the circuitry of FIG. 6 perform in the same manner described in conjunction with FIG. 6. Transistor 478 is normally in a nonconducting state, with audio generator 480 consequently turned off. Capacitor 488 is normally charged substantially to the voltage on conductor 292.

With turning on of rectifier 464 (under circumstances such as those previously described), capacitor 488 begins to discharge through resistor 490. If discharging of this capacitor continues for a long enough time, the voltage applied to the base of transistor 478 drops sufficiently to turn this transistor on. In the particular system being described herein, this period of time is about 1.8 seconds. It will be noted that this time period is slightly longer than the period of an operating cycle of the transmitter. The importance of this time relationship will be more fully explained later.

With turning on of transistor 478, audio generator 480 becomes energized and operates speaker 482, which then puts out an audible tone.

Similar operation, of course, characterizes all of the other output circuits.

Receiver Operation

Explaining now the operation of receiver 14 as a whole, this is best explained in conjunction with FIGS. 5, 6 and 7. Describing initial conditions which exist in the receiver prior to the receipt of any pulses over telephone wires 16*a*, 16*b*, all of the transistors in the receiver, with the exception of transistor 370, are turned off. Capacitor 308 (connected between ground and the base of transistor 310) is uncharged. Counter 274 is in a zero-count condition, and decoder 276 is in a condition applying positive voltage to each of its first 15 output terminals. A ground potential exists on terminal 276*p*. Solenoid 402 is nonenergized.

Let us assume, for the moment, that the 14 output circuits which are connected to the first fourteen output terminals of the decoder take the form of circuit 36 as illustrated in FIG. 6. In these circuits, the transistors corresponding to transistor 462 are turned on, and the silicon-controlled rectifiers corresponding to rectifier 464 are turned off. As a consequence, the lamps which are connected to the various output circuits, such as lamps 30, 32, are unlit.

One of the important features of the proposed system is that the receiver discriminates between and distinguishes received indexing and signaling pulses on the basis of their different respective pulse-height characteristics—more specifically, their different maximum voltage levels. It is further an important feature herein that such discrimination takes place on the basis of a comparison which is made between the maximum voltage level of a received pulse, and a reference voltage which is generated in response to prior-received indexing pulses. The level of the reference voltage, is contemplated herein, is related to the maximum voltage level of such prior-received indexing pulses.

Thus, and explaining how such a reference voltage is developed, as an indexing pulse is received over telephone wires 16*a*, 16*b*, this pulse turns on transistor 290 which, essentially, passes the pulse through (at nearly full level) to its emitter. From this emitter, the pulse is supplied through diode 306 to the junction between capacitor 308 and the base of transistor 310. Such pulses that are initially received by the receiver with capacitor 308 in a noncharged condition, are effective to charge up this capacitor to a voltage (ultimately—i.e., after receipt of several pulses) which is related to and which follows the average maximum voltage level of received pulses. For example, after receipt by the receiver of several indexing pulses from transmitter 12, capacitor 308 charges up to a voltage level which is just slightly less than the average maximum voltage levels of these pulses as such are received at the base of transistor 290. Assuming that such indexing pulses arrive with a maximum voltage level of about +20 volts, capacitor 308 charges to a voltage of about +18 volts.

It is thus apparent that the voltage to which capacitor 308 is charged at any time depends on the immediate past history of the maximum voltage levels of received indexing pulses. Experience with a system constructed as described herein has shown that it is the received indexing pulses which, for all practical purposes, affect the charge level on capacitor 308. Received signaling pulses have a nonappreciable effect on the capacitor. The voltage to which capacitor 308 is charged at any time constitutes a reference voltage herein.

With such charging up of capacitor 308, a positive voltage is applied to the base of transistor 310 which then causes this transistor to conduct. Assuming, for the purpose of an explanation, that capacitor 308 is charged to about +18 volts, with transistor 310 conducting, a voltage also of about +18 volts appears at the emitter of this transistor, and is supplied to the resistive voltage divider made up of resistors 312, 314, 316. In receiver 14, the resistance values of these three resistors are selected whereby the voltage which appears at the junction between resistors 312, 314, is approximately two-thirds that on the emitter of transistor 310, and the voltage which appears at the junction between resistors 314, 316 is approximately one-third that on the emitter. The voltages developed at these two junctions are referred to herein as subreference voltages. With a voltage of about +18 volts on this emitter, the voltage at the first-mentioned junction is about +12 volts, and that at the second-mentioned junction is about +6 volts.

The subreference voltage produced between resistors 312, 314 is supplied directly to the emitter of transistor 320. Similarly, the subreference voltage developed between resistors 314, 316 is applied directly to the emitter of transistor 318.

Under circumstances with the reference and subreference voltages thus properly developed (following receipt by the receiver of several indexing pulses in an operating cycle of the transmitter), the receiver is in a condition to distinguish between received pulses as contemplated herein, and to respond accordingly. For example, with receipt of an indexing pulse having a maximum voltage level (as received at the base of transistor 290) of about +20 volts, this pulse is applied from the emitter of transistor 290 to the bases of the transistors 318, 320. This pulse causes both of these transistors to conduct because it biases both of their bases to voltages above the voltages applied to their emitters.

With conduction of transistor 318, capacitor 354 begins to charge. Such charging of this capacitor prevents immediate turning on of transistor 322. The charging time required in capacitor 354 before transistor 322 can turn on is about 0.01 seconds. The reason for introducing a delay in turning on of transistor 322 will become apparent shortly.

With turning on of transistor 320, transistor 324 also turns on, and applies positive voltage to its collector. And, with this occurring, a positive voltage spike is applied through capacitor 446, resistor 444, and diode 442 to the counting input terminal (**274*a*) of counter 274. Inasmuch as this spike is coupled through a capacitor to the counter, its duration is insignificant with respect to the length of an indexing pulse. It is on the trailing edge of this short-duration spike that counter 274 counts. In the particular situation being described, the count in counter 274 changes from zero to one. Because of the insignificance of the length of the voltage spike just described with respect to the length of an indexing pulse, it may be assumed herein that counting in counter 274** takes place essentially on the occurrence of the lead edge of a received indexing pulse.

With the count in counter 274 changing to a count of one, decoder 276 applies a ground potential to its first output terminal **276*a*, and through this terminal and conductor 452 to output circuit 34. Such operation results in turning off of the transistor in circuit 34 which corresponds to transistor 462 in circuit 36 (see FIG. 6). As a consequence, the silicon-controlled rectifier in circuit 34, corresponding to rectifier 464 in circuit 36, is placed in a condition capable of being turned on should there then be applied (i.e., during the time that the transistor just mentioned is turned off) a positive voltage pulse to its gate. This situation, of course, changes with turning back on of the transistor, which operation will occur on receipt of the next indexing pulse and consequent changing of the count in counter 274**.

It will thus be seen that as successive indexing pulses are received, the silicon-controlled rectifiers in the different output circuits are placed successively in conditions to be turned on. The time that a particular silicon-controlled rectifier can be turned on terminates with the receipt of the next successive indexing pulse.

Another thing which occurs with turning on of transistor 324 is that a relatively large positive voltage is applied through diode 360 and resistor 328 to the base of transistor 322. It will be apparent that the application of this positive voltage occurs very shortly after initial turning on of transistors 318, 320. In particular, such application will occur before capacitor 354 has had an opportunity to charge sufficiently to turn on transistor 322. Such application of positive voltage to the base of transistor 322 positively prevents transistor 322 from turning on.

As will be explained very shortly, transistor 322 is only intended to turn on under circumstances with the receiver having received a signaling pulse. Under circumstances with the receiver having received an indexing pulse (which is the situation now being described), it is intended that transistor 322 be held in a nonconducting state. The delay in turning on of transistor 322 introduced by charging of capacitor 354, and the application of positive voltage to the base of this transistor with turning on of transistor 324 as described, is what enables pulse-height discriminator circuit 270 properly to discern and to distinguish the receipt by a receiver of an indexing pulse.

Still another event which occurs with turning on of transistor 324 is that capacitor 378 begins to charge, and by so doing prevents immediate turning on of transistor 362. The continuous charging time required in capacitor 378 before transistor 362 can turn on is about 0.1 seconds. It will be noted that this charging time is considerably longer than the duration of an indexing pulse.

With termination of the just-received indexing pulse, .05-seconds after its beginning, transistors 290, 318, 320, 324 stop conducting. As a consequence, capacitor 354 discharges through resistor 330, and capacitor 378 discharges through the parallel combination of resistor 374 and diode 376 which are in series with resistor 358. It will thus be apparent that under no circumstance can transistor 362 turn on in response to the receiver receiving an indexing pulse. An indexing pulse simply does not maintain transistor 324 conducting long enough to produce a suitable charging time in capacitor 378.

The operations just described in the receiver repeat with each receipt of an indexing pulse. Obviously, as successive indexing pulses are received, the count in counter 274 increases (by a count of one each time), and suitable corresponding changes occur in the voltage levels applied to the output terminals of decoder 276.

Explaining now what happens in the receiver when a signaling pulse is received over telephone wires **16*a*, 16*b*, and assuming that such a pulse has a maximum voltage level (as received at the base of transistor 290) of about +10 volts, this pulse is applied through transistor 290 to the bases of transistors 318, 320. Because the subreference voltage applied to the emitter of transistor 320 is above +10 volts, namely +12 volts, transistor 320 does not switch into conduction. However, because the subreference voltage applied to the emitter of transistor 318 is below +10 volts, namely +6 volts, transistor 318 does switch into conduction. Thus, capacitor 354 begins charging, and again initially holds off of turning on of transistor 322**.

Since transistor 320 remains nonconductive under these circumstances, transistor 324 also remains nonconductive, and no positive voltage is applied (as previously described) through diode 360 and resistor 328 to the base of transistor 322. As a consequense, capacitor 354 continues to charge to a voltage sufficient to turn on transistor 322—such turning on occurring about 0.01 seconds after turning on of transistor 318.

With turning on of transistor 322, positive voltage is applied to its collector, and from this collector and through resistor 460 and conductor 458, to the gates of the silicon-controlled rectifiers in each of the output circuits connected to decoder 276. If, at the time of the application of this positive voltage to the output circuits, any one of the silicon-controlled rectifiers in the circuits is in a condition capable of being turned on (i.e., with the transistor in the circuit then turned off), the rectifier switches into and locks in conduction. If this occurs, the lamp connected to its anode is energized. Thereafter, and until opening of switch **402*b***, the turned-on rectifier remains turned on, and the energized lamp remains energized.

Describing now what takes place in the receiver when a long pulse 262 is received, and assuming that this pulse is the sixteenth successive pulse to be received by the receiver progressing from when counter 274 last was in a zero-count condition, this pulse is passed through transistor 290 to the bases of transistors 318, 320. With pulse 262 having a maximum voltage level (as received at the base of transistor 290) of about +20 volts, both transistors 318, 320 turn on as was true in the case of the receiver receiving an indexing pulse. As a consequence, transistor 324 turns on, and transistor 322 is prevented from turning on. With such turning on of transistor 324, a positive voltage spike is applied to counting input terminal **274*a* of counter 274, with the count in the counter then changing from 15 to zero. With such a count change, decoder 276 applies a ground potential voltage to output terminal 276*p*, and through this terminal and conductor 456 to the junction between resistors 430, 432. Transistor 372 thereupon stops conducting, and transistor 370** starts conducting.

Transistor 324 remains conducting throughout the duration of pulse 262, and as a consequence permits sufficiently long charging of capacitor 378 to cause transistor 362 to conduct. It will be recalled that the length of a pulse 262 is about .145 seconds, and the continuous charging time required in capacitor 378 to permit transistor 362 to conduct is about 0.1 seconds. Transistor 362 thus turns on about 0.1 second after turning on of transistor 324.

With turning on of transistor 362, transistor 364 also turns on and supplies a positive voltage pulse through capacitor 410. However, since transistor 370 is now conducting, this positive voltage pulse is, in effect, grounded through resistor 408 and transistor 370. As a consequence, the pulse is ineffective to produce any further action in the receiver.

At the conclusion of pulse 262, transistors 290, 318, 320, 324, 362, 364 stop conducting. On the receipt by the receiver of the next indexing pulse, which will be the first indexing pulse of the next operating cycle of transmitter 12, counter 274 stores a count of one, decoder 276 reapplies a positive voltage to terminal **276*p*, and transistors 370, 372** return to nonconducting and conducting states, respectively.

A somewhat different operation, however, occurs in the receiver if a pulse 262 is received at a time when it is not the sixteenth successive pulse progressing from the last time that counter 274 was in a zero-count condition. If such is the case, then, receipt of the pulse will not result in turning off of transistor 372 and turning on of transistor 370. The reason is, of course, that such switching of these two transistors can occur only when the sixteenth output terminal of decoder 276 is supplied a ground potential, which can occur only with a count of zero in counter 274.

Transistors 290, 318, 320, 324, 362, 364 operate in exactly the same manners just described for them. In this case, however, the positive voltage pulse supplied through capacitor 410 with turning on of transistor 364 is not grounded through transistor 370, but rather is applied through resistor 408 and diode 404 to the base of transistor 366. When such occurs, the one shot multivibrator comprising transistors 366, 368 fires.

More specifically, transistor 366 turns on, and in so doing turns on transistor 368. With turning on of transistor 366, coil **402*a* in solenoid 402 energizes, and switch 402*b* opens. The significance of this operation will be explained shortly. With turning on of transistor 368, positive voltage is applied to its collector, and from this collector and through resistor 414 and conductor 450 is applied to reset input terminal 274*b* of counter 274. As a consequence, counter 274 returns to a zero-count condition, and all output terminals of decoder 276, except terminal 276*p***, return to conditions with positive voltage on them.

With opening of switch **402*b*, and referring to FIG. 6 along with FIG. 5, any silicon-controlled rectifier, such as rectifier 464, which is then conducting, and any lamp, such as lamp 32**, which is then energized, is turned off.

Considering now how the modified form of output circuits (illustrated for circuit 36 in FIG. 7) perform when employed in the receiver, turning on and off of the transistors, silicon-controlled rectifiers, and lamps (such as transistor 462, rectifier 464, and lamp 32) occurs in exactly the same manner as described above in connection with the type of output circuit illustrated in FIG. 6. However, an additional operation takes place in the modified circuits. Further explaining, and with reference to circuit 36 as illustrated in FIG. 7, with turning on of rectifier 464, capacitor 488, which is initially charged, discharges. If rectifier 464 continues conducting long enough (about 1.8 seconds as mentioned earlier) to permit sufficient discharging of capacitor 488, transistor 478 conducts and turns on audio generator 480 which then operates speaker 482. It will be noted again that the continuous discharging time required in capacitor 488 to permit transistor 478 to conduct is longer than the period of an operating cycle of transmitter 12.

It will thus be apparent that if, after turning on of rectifier 464, switch **402*b* remains closed for a period of about 1.8 seconds, an audible tone is produced in speaker 482 which confirms turning on of the rectifier. If switch 402*b*** opens before the elapse of this time period, the audio generator remains nonenergized.

Operation of System As A Whole

With operation of transmitter 12 in successive operating cycles, recurrent trains of pulses are produced and transmitted over telephone wires **16*a*, 16*b*, with each such train including 15 pulses 254, and following these pulses a pulse 262 (as illustrated in FIG. 4, graph VII). In the transmitter, these pulses result in counting-up in counter 44, and scanning at the output terminals of decoder 46 for the purpose of noting the conditions of the signaling device switches, such as switches 22, 24**.

As the successive indexing pulses in an operating cycle of the transmitter are received in the receiver, they produce what might be through of as an operating cycle in the receiver also, wherein they produce counting-up in counter 274, and scanning at the output terminals of decoder 276 to enable energizing of the lamps, such as lamps 30, 32.

Under normal operating circumstances, the first indexing pulse in an operating cycle of the transmitter places a count of one in counter 44, and also in counter 274. The second indexing pulse places a count of two in counter 44, and also in counter 274. Such operation continues through and including the sixteenth long pulse which is produced at the end of 15 indexing pulses. With counts in counters 44, 274 advancing as just described along with one another, a long pulse 262 at the end of an operating cycle has no special effect in the operation of the system. Under these circumstances, the transmitter and receiver may be thought of as being synchronized with one another.

It will be apparent that with the particular system described herein, the first 14 indexing pulses in an operating cycle are each associated with a different associated signaling and indicating device. The first indexing pulse is associated with switch 22 and lamp 30; the second indexing pulse is associated with switch 24 and lamp 32; and so on.

Each indexing pulse which is produced by the transmitter sets up in the transmitter a condition where the associated signaling device switch can effect a signaling pulse (following the indexing pulse), and in the receiver sets up a condition where the associated lamp can thereafter be lit if there is then received, before the next indexing pulse, such a signaling pulse. In the particular operating cycle of the transmitter described earlier, which produces a string of pulses such as that illustrated in FIG. 4, graph VII, it will be recalled that a signaling pulse 258 is produced and transmitted after the second indexing pulse 254. Generation of this signaling pulse has resulted from the fact that during the operating cycle, and at the time of the conclusion of the second indexing pulse in the cycle, switch 24 was open. As a consequence, and during receipt by receiver 14 of the various pulses transmitted during this operating cycle, lamp 32 becomes lit to indicate the open condition of switch 24. Obviously, had any other signaling device switch been open during the cycle, its associated lamp connected to the receiver would likewise have become lit.

In the event that for some reason the transmitter and receiver get out of synchronization, the long pulse 262, which is transmitted at the end of the transmitter operating cycle during which such nonsynchronizing occurs, results in resetting of counter 274 in the receiver, whereupon it will be apparent that the transmitter and receiver are returned to a condition of being synchronized. Where such resetting occurs, it will be recalled that solenoid 402 is energized, and switch **402*b* is opened, which operation results in turning off of any then-conducting silicon-controlled rectifier in any output circuit. As a consequence, any possibility of a lighted lamp being interpreted as indicating the condition of the wrong signaling device switch is greatly minimized. With the output circuits in the receiver taking the form of circuit 36 as illustrated in FIG. 7**, audible confirmation of turning on of a lamp cannot occur until a sufficient time period has elapsed to permit placement of the transmitter and receiver in a synchronized condition.

The proposed signaling system thus offers the various features and advantages described earlier for it. Complicated filtering circuitry is not required—signal differentiation being made on the basis of different maximum voltage levels characterizing different pulses which are transmitted in the system. Time sharing and scanning of the various signaling and indicating devices, of course, also greatly reduces the complexity of required circuitry.

With the maximum voltage levels of received pulses being discerned on the basis of a comparison thereof with a reference voltage produced by indexing pulses in the system, line losses which may occur in the conductors that extend between the transmitter and receiver have no appreciable effect on the operation of the system.

It is appreciated, of course, that there may be applications where it is desired to convey signals by way of radio or microwave equipment, rather than over wires. In such a case, and as an example, indexing pulses might be converted (at the location of the transmitter) into AC waves of one frequency, with signaling pulses converted into such waves of another frequency. At the location of the receiver, these waves may be reconverted into pulses similar to the originating pulses generated by the transmitter.

While a preferred embodiment of the invention, and a modification of one of its circuits, have thus been described herein, other modifications and variations are of course possible, and may be made without departing from the spirit of the invention.

It is claimed and desired to secure by letters patent:

1. An electrical communication system for plural pairs of associated spaced-apart signaling and indicating devices, where each signaling device has signaling and nonsignaling states, and each indicating device has indicating and nonindicating states, said system comprising a common transmission medium, transmitter means at one location operatively connected to said medium and to said signaling devices, operable to produce and supply to said medium successive trains of time-spaced electrical indexing pulses, with each such pulse in a train associated with a different associated signaling and indicating device, and further operable following each indexing pulse to produce and supply to said medium a signaling pulse under circumstances with the signaling device associated with such indexing pulse being then in a signaling state, said transmitter means including an index-pulsing means which produces said indexing pulses, a pulse-responsive indexing means operatively connected to said index-pulsing means which switches successively to different indexed states in response to successive indexing pulses, each of such indexed states being associated with a different associated signaling and indicating device, and signal-pulsing means operatively connected to said index-pulsing and indexing means, operable following an indexing pulse, and with the signaling device which is associated with the indexed state then occupied by said indexing means in a signaling state, to produce a signaling pulse, and receiver means at another location which is remote from said one location operatively connected to said medium and to said indicating devices, operable to receive the different indexing and singaling pulses conveyed through said medium, and further operable on receiving a signaling pulse to place the indicating means associated with the preceding indexing pulse in an indicating state.

2. The system of claim 1, wherein said index-pulsing means and said signal-pulsing means are constructed to produce pulses having different respective pulse-height characteristics.

3. The system of claim 1, wherein said transmitter means further comprises for each signaling device a signal-gating circuit operatively connected to the device, to said indexing means and to said signal-pulsing means, the signal-gating circuit for a signaling device supplying an instruction signal to said signal-pulsing means under circumstances with the signaling device in a signaling state and the indexing means occupying the indexed state associated with the signaling device.

4. The system of claim 3, wherein said signal-pulsing means includes a pair of input terminals with one coupled to said index-pulsing means to note the conclusion of an indexing pulse, and the other coupled to said signal-gating circuit to receive an instruction signal, said signal-pulsing means being constructed to produce a signaling pulse on its said other input terminal receiving an instruction signal following its said one input terminal noting the conclusion of an indexing pulse.

5. An electrical communication system for plural pairs of associated spaced-apart signaling and indicating devices, where each signaling device has a signaling and nonsignaling states, and each indicating device has indicating and nonindicating states, said system comprising a common transmission medium, index-pulsing means at one location operatively connected to said medium, operable to produce successive trains of time-spaced indexing pulses with each such pulse associated with a different associated signaling and indicating device, a first pulse-responsive indexing means at said one location operatively connected to said index-pulsing means, said indexing means having different indexed states with each associated with a different associated signaling and indicating device, and being placeable successively in different ones of its said indexed states in response to successive indexing pulses produced by said index-pulsing means, signal-pulsing means at said one location operatively connected to said medium, to said indexing means, and to said index-pulsing means, operable following an indexing pulse, and with the signaling device which is associated with the indexed state then occupied by said indexing means in a signaling state, to produce a signaling pulse, a second pulse-responsive indexing means operatively connected to said medium at another location which is remote from said one location, said second indexing means having different indexed states with each associated with a different associated signaling and indicating device, and being placeable successively in different ones of its said indexed states in response to successive indexing pulses from said index-pulsing means transmitted over said medium, and output circuit means operatively connected to said medium, to said second indexing means, and to said indicating devices, operable in response to a signaling pulse from said signal-pulsing means transmitted over said medium, and with said second indexing means in the indexed state produced by the last-transmitted indexing pulse, to place the indicating device associated with such indexed state in an indicating state.

6. The system of claim 5, wherein said index-pulsing means is constructed to produce indexing pulses having one pulse-height characteristic, and said signal-pulsing means is constructed to produce signaling pulses having another pulse-height characteristic which differs from said one characteristic.

7. The system of claim 6 which further comprises at said other location a pulse-height discriminator circuit operatively connected to said medium, constructed to determine whether a pulse transmitted over said medium has either of said two different pulse-height characteristics.

8. The system of claim 7, wherein said discriminator circuit includes a reference voltage producer responsive to indexing and signaling pulses transmitted over said medium to produce a reference voltage having a level related to the pulse-height characteristics of such pulses, and comparing circuit means operatively connected to said medium and to said reference voltage producer for comparing the pulse-height characteristic of a pulse transmitted over said medium with the level of said reference voltage.

9. In a time-sharing electrical communication system including a common transmission medium, and transmitter means connected to said medium for producing and supplying thereto successive trains of time-spaced indexing pulses, and intermediate such pulses, and in accordance with information to be conveyed over the system, signaling pulses related to such information, with said indexing and signaling pulses having different respective maximum voltage levels, receiver means remove from said transmitter means comprising a reference voltage producer operatively connected to said medium responsive to received pulses to produce a reference voltage having a level related to the average voltage level of such pulses, comparing circuit means operatively connected to said medium and to said reference voltage producer for determining, by comparison with said reference voltage, which of said different maximum voltage levels a pulse from said transmitter has, and a voltage divider circuit interposed electrically between and coupled to said reference voltage producer and to said comparing circuit means, said voltage divider circuit producing from said reference voltage two different sub-reference voltages whose respective levels are substantially directly proportional to that of said reference voltage, one of said sub-reference voltages having a level which is below the maximum voltage level of the pulses having the greatest maximum level and above the maximum voltage level of the other pulses, and the other sub-reference voltage having a level which is below the maximum voltage level of said other pulses.

10. The system of claim 9, wherein said comparing circuit means includes at least three input terminals, with one connected to said voltage divider circuit to be supplied said one sub-reference voltage, another connected to said voltage divider circuit to be supplied said other sub-reference voltage, and the third operatively connected to said medium to follow pulses transmitted thereover.

11. The system of claim 10, wherein said comparing circuit means includes a first comparing circuit operatively connected to said one and third input terminals effective to produce an output signal on the voltage level at said third input terminal exceeding that at said one input terminal, a second comparing circuit operatively connected to said other and third input terminals effective to produce an output signal at a predetermined time interval after the voltage level at said third input terminal exceeds and remains greater than that at said other input terminal, and inhibit means operatively interconnecting said first and second comparing circuits inhibiting the production of an output signal by said second comparing circuit with production of an output signal by said first comparing circuit.

12. In a receiver including an input terminal for receiving electrical pulses where such pulses may have either of two different maximum voltage levels, a reference voltage producer operatively connected to said input terminal responsive to pulses received thereby to produce a reference voltage having a level related to the average pulse-height of such pulses, comparing circuit means operatively connected to said input terminal and to said reference voltage producer for determining, by comparison with said reference voltage, which of said two different maximum voltage levels a pulse received by said input terminal has, and a voltage divider circuit interposed electrically between and coupled to said reference voltage producer and to said comparing circuit means, said voltage divider circuit producing from said reference voltage two different sub-reference voltages whose respective levels are substantially directly proportional to that of said reference voltage, one of said sub-reference voltages having a level which is below the maximum voltage level of the pulses having the greater maximum voltage level and above the maximum voltage level of the other pulses, and the other sub-reference voltage having a level which is below the maximum voltage level of said other pulses.

13. The receiver of claim 12, wherein said comparing circuit means includes at least three input terminals, with one connected to said voltage divider circuit to be supplied said one sub-reference voltage, another connected to said voltage divider circuit to be supplied said other sub-reference voltage, and the third operatively connected to said input terminal to follow pulses received thereby.

14. The receiver of claim 13, wherein said comparing circuit means includes a first comparing circuit operatively connected to said one and third input terminals effective to produce an output signal on the voltage level of said third input terminal exceeding that at said one input terminal, a second comparing circuit operatively connected to said other and third input terminals effective to produce an output signal a predetermined time interval after the voltage level at said third input terminal exceeds and remains greater than that at said other input terminal, and inhibit means operatively interconnecting said first and second comparing circuits inhibiting the production of an output signal by said second comparing circuit with production of an output signal by said first comparing circuit.

15. An electrical communication system for plural pairs of associated spaced-apart signaling and indicating devices, where each signaling device has signaling and nonsignaling states, and each indicating device has indicating and nonindicating states, said system comprising a common transmission medium, transmitter means at one location operatively connected to said medium and to said signaling devices, operable to produce and supply to said medium successive trains of time-spaced electrical indexing pulses, with each such pulse in a train associated with a different associated signaling and indicating device, and further operable following each indexing pulse to produce and supply to said medium a signaling pulse under circumstances with the signaling device associated with such indexing pulse being then in a signaling state, and receiver means at another location which is remote from said one location operatively connected to said medium and to said indicating devices, operable to receive the different indexing and signaling pulses conveyed through said medium, and further operable on receiving a signaling pulse to place the indicating means associated with the preceding indexing pulse in an indicating state, said receiver means comprising a pulse-responsive indexing means which switches successively to different indexed states in response to successive indexing pulses transmitted over said medium, each of such indexed states being associated with a different associated signaling and indicating device, and output circuit means operatively connected to said indexing means and to said indicating devices, operable in response to a signaling pulse transmitted over said medium, and with said indexing means in the indexed state produced by the last-transmitted indexing pulse, to place the indicating device associated with such indexed state in an indicating state.

* * * * *